United States Patent [19]
McPhillips

[11] 3,834,742
[45] Sept. 10, 1974

[54] TUBE COUPLING
[75] Inventor: Norris J. McPhillips, Otsego, Mich.
[73] Assignee: Parker-Hannifin Corporation, Cleveland, Ohio
[22] Filed: Nov. 3, 1972
[21] Appl. No.: 303,480

Related U.S. Application Data
[63] Continuation-in-part of Ser. No. 112,964, Feb. 5, 1971, abandoned.

[52] U.S. Cl. ............................. 285/249, 285/382.7
[51] Int. Cl. ............................................. F16l 33/20
[58] Field of Search ........ 285/249, 248, 250, 382.7, 285/341, 342, 343

[56] References Cited
UNITED STATES PATENTS

| | | | |
|---|---|---|---|
| 2,059,920 | 11/1936 | Weatherhead | 285/382.7 X |
| 2,201,404 | 5/1940 | Kreidel | 285/382.7 X |
| 2,252,920 | 8/1941 | Edelmann | 285/249 X |
| 2,321,260 | 6/1943 | Stecher | 285/382.7 X |
| 2,544,108 | 3/1951 | Richardson | 285/341 X |
| 2,613,959 | 10/1952 | Richardson | 285/382.7 X |
| 3,055,684 | 9/1962 | Currie | 285/382.7 X |
| 3,174,778 | 3/1965 | Gross | 285/341 |
| 3,493,250 | 2/1970 | Hertel | 285/249 |
| 3,603,912 | 9/1971 | Kelly | 285/249 X |

FOREIGN PATENTS OR APPLICATIONS

| | | | |
|---|---|---|---|
| 339,447 | 8/1959 | Switzerland | 285/382.7 |

*Primary Examiner*—Thomas F. Callaghan
*Attorney, Agent, or Firm*—Donnelly, Maky, Renner & Otto

[57] ABSTRACT

A coupling for elastomeric tube characterized in the provision of a reversible tube embracing sleeve which has a radially projecting collar or flange at its middle and which is tapered to relatively thin radial ends from said collar, said sleeve, when radially contracted into gripping and sealing engagement with the tube by engagement between cam surfaces of a nut and a body having screw threaded engagement with each other, being of arched configuration from its middle toward its end with its end portions of reversely curved configuration and having said collar in abutting engagement with a shoulder in the nut and axially spaced from the end of said body. The coupling herein is further characterized in that the body, nut, and uncontracted sleeve bores are of substantially equal diameter slightly larger than the tube diameter, and although the axially outer end portion of the sleeve is contracted to greater extent than the axially inner end portion of the sleeve the greatest sealing and gripping pressure is obtained at the axially inner end portion of the sleeve whereat it has camming engagement with the body cam surface and whereat it is contracted into engagement with the tube owing to the axial crowding action exerted on the tube while it is abutted against a stop shoulder in the body as the axially outer portion of the sleeve is contracted by the nut member and axially advanced with respect to the tube during the contraction of the axially inner end portion of the sleeve by engagement with the body cam surface. In one form of the invention the nut bore is flared out or terminates short of the axially outer end of the contracted sleeve so that the extreme axially outer end of the sleeve is not embedded in the tube and in another form of the invention the ends of the sleeve are tapered to relatively thin radial cross-section so that in the contracted condition of the sleeve the inner surfaces flare out without the axially outer end being embedded in the tube even though the extreme axially outer end portion of the sleeve is surrounded by the nut bore. In yet another form of the invention, the axially outer end of the sleeve is tapered to match the taper of the nut member cam surface thus to align the body, sleeve, and nut bores to facilitate axial insertion of the tube therewithin.

The coupling herein is further characterized in that the flange portion of a tube supporting nipple is capable of being secured in the body bore in concentric relation to the body, sleeve, and nut bores by expanding the flange portion so as to engage the body bore as by a knurling operation on the flange or by a staking operation on the axially outer end face of the flange portion. The present invention also contemplates the provision of a tube supporting nipple having frictional engagement in the body so as to retain the nipple in place during shipment, storage, and handling but which becomes a part of the tube-contracted sleeve assembly so that when the nut is unscrewed from the body, the tube together with the contracted sleeve therearound and the nipple therewithin may be axially withdrawn from the body bore.

5 Claims, 7 Drawing Figures

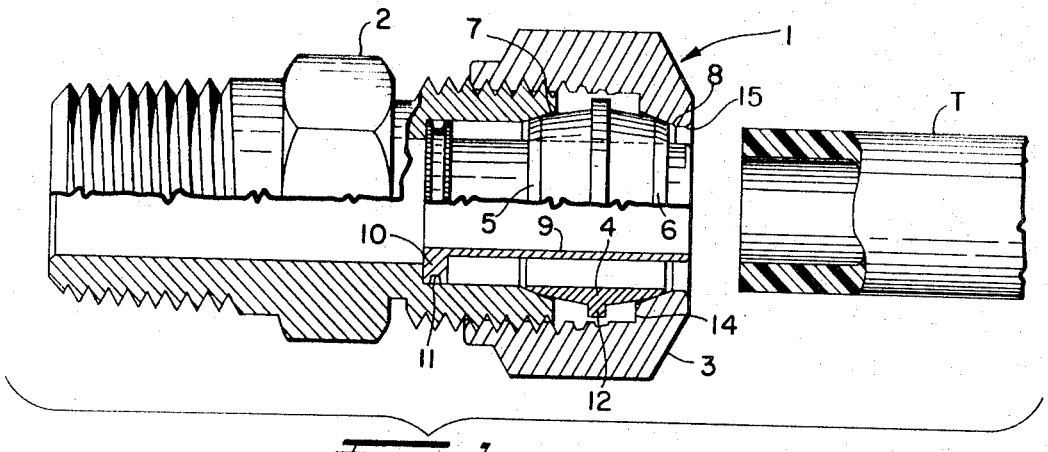
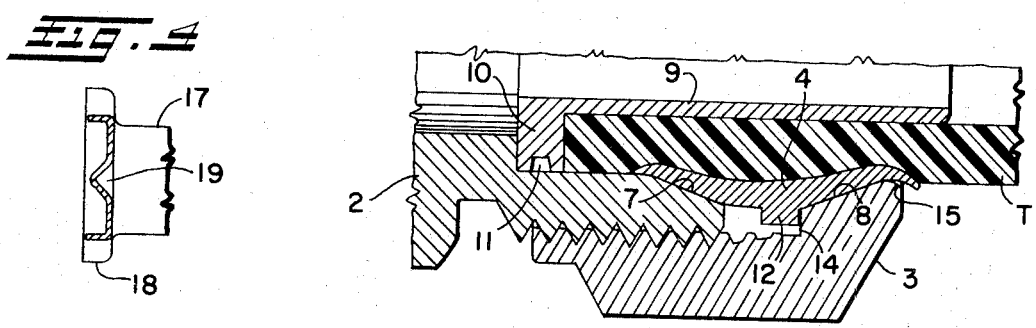
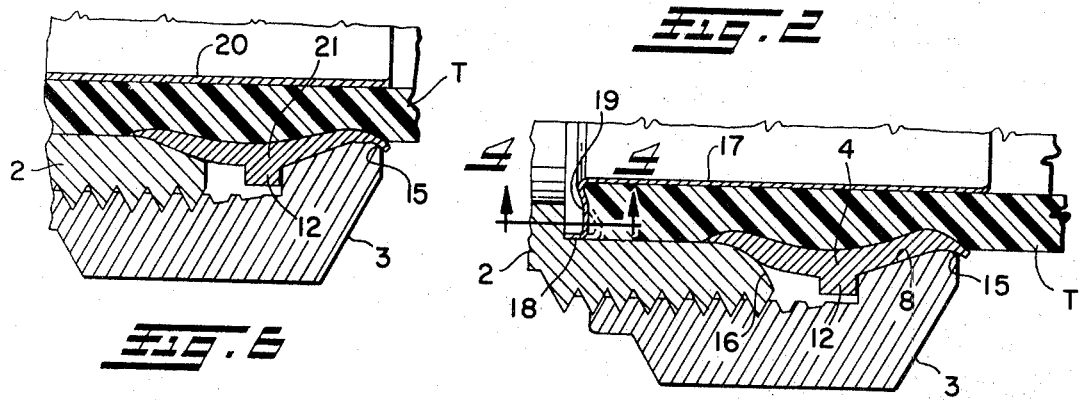
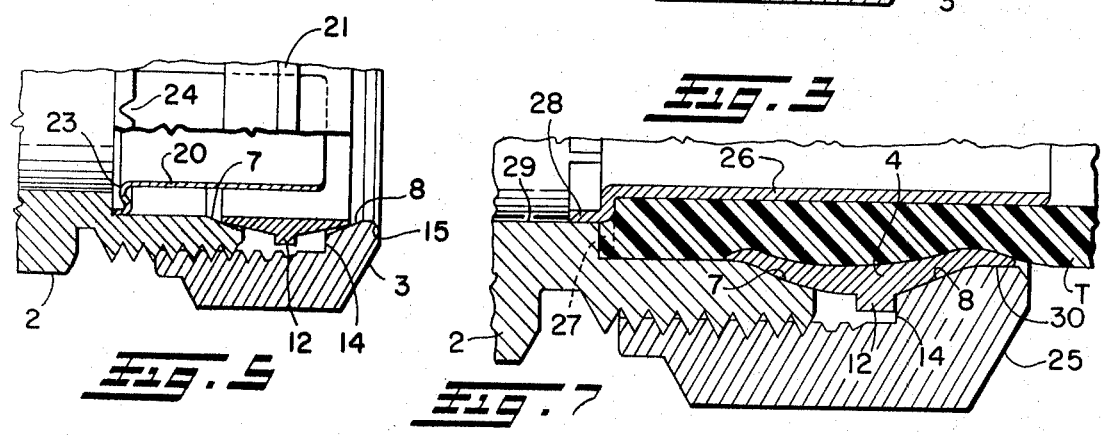

3,834,742

TUBE COUPLING

This application is a continuation-in-part of application Ser. No. 112,964 filed Feb. 5, 1971 and now abandoned.

BACKGROUND OF THE INVENTION

It is of course well known in the tube coupling art to provide radially contractible tube embracing sleeves which are tapered at one or both ends for contraction into gripping and sealing engagement with the tube. In some cases the taper of the sleeve is so great that when the sleeve is radially contracted there is virtually no axial crowding of the tube material into the body bore and therefore it is difficult to obtain a sufficiently strong and fluid-tight joint, as for example when the tube is of nylon or like thermoplastic material.

In yet other cases wherein it is desired to contract both ends of a tube gripping and sealing sleeve to provide a stronger grip at the axially inner end of the sleeve it has been found necessary to contract the axially inner end of the sleeve to greater extent than the axially outer end with consequent greater penetration of the axially inner end of the sleeve into the tube with possible weakening of the tube.

SUMMARY OF THE INVENTION

This invention relates to a tube coupling for thermoplastic or like tube comprising a nut and body having screw-threaded engagement with each other and forming a tube end receiving cavity, and a contractible sleeve disposed around the tube and having its end portions engaged with cam surfaces of said body and nut members to effect contraction of both end portions of the sleeve upon screwing together of said body and nut. The body, nut, and sleeve are so fashioned that the axially outer end portion of the sleeve is contracted to greater extent than the axially inner end portion but yet a greater gripping and sealing pressure is obtained between the axially inner end portion of the sleeve and the body cam surface and the tube.

The tube coupling herein is characterized in the nut and body bores and the uncontracted sleeve bore are of substantially equal diameter approximately the same as the diameter of the tube to be coupled, the sleeve being tapered from relatively thin ends toward the middle for engagement with the body and nut cam surfaces adjacent the bores thereof, the nut bore being flared and/or terminating short of the axially outer end of the contracted sleeve, whereby, in the radially contracted condition of the sleeve, the axially outer end portion flares outwardly without the extremity of axially outer end portion being embedded in the surface of the tube, thus to provide a gradually releasing grip but yet a sufficiently great penetration of the adjacent portion into the tube to effect an axial crowding and displacement action as the axially inner end portion of the sleeve is contracted into gripping and sealing engagement with the tube but at greater gripping and sealing pressure even though the extent of radial contraction of the axially inner portion of the sleeve may be less than at the axially outer end portion thereof.

The tube embracing sleeve is symmetrical from its middle to its opposite ends thus to render the sleeve reversible end for end within the coupling.

The tube embracing sleeve has a stop collar between its end which is engaged by a shoulder in the nut to limit the extent of contraction of the axially outer end portion of the sleeve, to force the sleeve into the body bore and to prevent the sleeve from being extruded out through the nut except as controlled by the length of the sleeve from the collar to the outer end of the sleeve.

The coupling herein also employs a tube embracing sleeve in which the end portions are of progressively increasing radial thickness from the ends toward the middle with a greater rate of variation of thickness adjacent the ends of the sleeve so as to match the nut cam surface to assist in location of the sleeve coaxially with the nut and body bores when the sleeve is in uncontracted condition for facilitating insertion of the tube into said bores.

The tube coupling herein also has a tube supporting nipple either firmly secured in the body bore in concentric relation thereto by expansion of a flange portion of the nipple into interfering relation in the body bore or yieldably frictionally engaged in a bore in the body so as to be retained therein during shipment, storage, and handling but which becomes a part of the tube-contracted sleeve assembly when the nut is unscrewed from the body and when the tube is axially withdrawn from the body.

Other objects and advantages of the present invention will appear hereinafter.

BRIEF DESCRIPTION OF THE DRAWING

FIG. 1 is a side elevation view partly in cross section showing one embodiment of the invention with the parts in finger-tight assembled relation ready to receive the end portion of a tube to be secured to the coupling assembly;

FIG. 2 is an enlarged fragmentary cross section view illustrating the FIG. 1 coupling in its normally assembled condition with the tube embracing sleeve having been contracted at both ends into gripping and sealing engagement with the tube with greater sealing pressure applied at the axially inner end portion of the sleeve whereat it contacts the body cam surface and the surface of the tube;

FIG. 3 is a fragmentary cross-section view similar to FIG. 2 except that the body cam surface has been modified to achieve yet a greater contact pressure between the axially inner end portion of the sleeve and the body and tube;

FIG. 4 is a cross section-view taken substantially along the line 4—4, FIG. 3;

FIG. 5 is a fragmentary cross-section view of another coupling in finger-tight condition;

FIG. 6 is an enlarged fragmentary cross-section view of the FIG. 5 coupling in its normally tightened condition; and FIG. 7 is a fragmentary cross-section view of yet another embodiment of the invention in its normally assembled condition.

DETAILED DESCRIPTION OF THE INVENTION

The tube coupling 1 illustrated in FIGS. 1 and 2 comprises a body 2, a nut 3 having screw-threaded engagement with said body 2, and a contractible tube embracing sleeve 4 having its end portions 5 and 6 in engagement with corresponding tapered cam surfaces 7 and 8 of the body 2 and nut 3. The bores in the nut 3, sleeve 4, and body 2 are preferably of substantially equal diameter slightly larger than the outside diameter of the tube T to be coupled. In the case of a tube T of nylon or like thermoplastic material there is secured in the body 2 a tube supporting nipple 9 which preferably has an outside diameter approximately equal to the inside diameter of the tube T. The nipple 9 is of axial length so as to extend axially outwardly beyond the axially outer end of the tube embracing sleeve 4 at least when the coupling assembly is tightened as shown in FIG. 2.

In the coupling assembly 1 illustrated in FIGS. 1 and 2, the flange 10 of the nipple 9 is a press fit in the bore of body 2 and to enhance the tightness with which the nipple 9 is held in the body 2 the periphery of the flange 10 may be knurled or otherwise roughened. In addition, a peripheral groove 11 is formed in the flange 10 to provide narrow edges which are embedded in the body bore. This also facilitates manufacture in that the flange 10 may be machined to a diameter smaller than the body bore, whereupon the knurling operation will enlarge the flange 10 so as to have an interference fit in the body bore.

When the coupling parts are in finger-tight condition as shown in FIG. 1 the tube T may be readily inserted into the annular cavity defined between the nipple 9 and the surrounding bores of the body 2, sleeve 4, and nut 3, and to facilitate such insertion of the tube T the end of the nipple 9 may be rounded or chamfered as shown.

Referring now in detail to the tube embracing sleeve 4 the same is of symmetrical form with respect to a center plane normal to the axis. Each end of the sleeve is of small radial thickness e.g. from 0.004 inch to 0.008 inch for a sleeve 4 for a 3/4 inch O.D. tube T. The sleeve 4 as aforesaid has beveled ends 5 and 6 which are of say, 20° angle, the same as the taper of the body and nut cam surfaces 7 and 8. From the beveled surfaces 5 and 6 the sleeve 4 is of progressively increasing radial thickness toward the middle, the taper being for example 8° adjacent the surfaces 5 and 6. At the middle of the sleeve 4 is a radially projecting stop collar 12 which cooperates with the stop shoulder 14 of the nut 3 as shown in FIG. 2 to limit the degree of contraction of the axially outer end portion of the sleeve 4 when the nut 3 is tightened. Initially the I.D. of the shoulder 14 is slightly less than the smallest diameter of the collar 12 so that the sleeve 4 will be radially contracted thereat. By reason of the symmetrical construction of the sleeve 4 it is reversible end for end so that when the parts are assembled as in FIG. 1, no attention need be paid to which end engages the body cam surface 7 and which end engages the nut cam surface 8.

For a purpose which will become apparent, the axial length of the sleeve 4 from the collar 12 to the respective ends thereof is greater than the axial distance from the nut stop shoulder 14 to the axially outer end of the nut 3, or to the nut bore where the rounding or chamfering 15 commences.

When the FIG. 1 parts are assembled to finger-tight condition, the steeper beveled portions 5 and 6 will engage the body and nut cam surfaces 7 and 8 and therefore the sleeve 4 will be held in centered position coaxial with the body and nut bores to facilitate shoving of the tube end into the annular cavity defined between these parts and the tube supporting nipple 9.

After the tube end has been shoved into the coupling assembly cavity the coupling assembly 1 is ready to be tightened to grip the tube T and to form a fluid-tight assembly with the sleeve 4 in fluid-tight engagement with the body 2 and with the tube T. As the nut 3 is initially tightened, there will be relative axial movement of the nut 3 with respect to the sleeve 4 and of the sleeve 4 with respect to the body 2, thus to cause initial radial contraction of both ends of the sleeve 4. As the tightening operation progresses the ends of the sleeve 4 bore will come into contact with the outer surface of the tube T with resulting crowding action of the tube material axially inwardly against the nipple flange 10. Because the sliding or dynamic coefficient of friction between the nut 3 and the sleeve 4 is less than the coefficient of friction between the sleeve 4 and the body 2, the tightening of the nut 3 will effect more rapid axial movement of the nut 3 with respect to the sleeve 4 than the rate of axial travel of the sleeve 4 against the cam surface 7 of the body 2. Thus, the nut shoulder 14 engages the stop collar 12 as shown in FIG. 2 thus to limit the extent of contraction of the axially outer end portion of the sleeve 4 but at that time the axially outer end of the sleeve 4 flares out axially beyond the rounded or chamfered portion 15 at the end of the nut 3 bore so that there is decreased compression on the tube T thereat. The outer end portion of the sleeve 4 may flare outwardly to a diameter the same as, or in some cases, greater than the nut bore whereby the end of the sleeve 4 is not embedded in the tube T.

At that time due to radial compression and axial displacement of the tube material and the axial crowding action of the sleeve 4 on the tube T, the tube material within the axially inner end portion of the sleeve 4 is under substantially greater compression to establish a better fluid-tight contact between the sleeve 4 and the body cam surface 7 and between the sleeve 4 and the tube T even though the axially inner end portion of the sleeve 4 has not been radially contracted to as great an extent as the axially outer end portion of the sleeve 4. In other words, the initially beveled axial inner end 5 is yet confined by the bore of the body 2 whereas the axially outer end 6 is partially beyond the bore of the nut and thus is unconfined so as to exert less compression on the tube T thereat than at the axially inner end portion. However, the minimum diameter of the contracted sleeve 4 is adjacent the axially outer end portion thereof so as to exert firm compression and axial crowding of the tube material toward the body 2.

Furthermore, it is to be noted that when the parts are in the finger-tight condition the axially outer end portion of the sleeve is not visible but when the coupling parts are tightened as in FIG. 2 the axially outer end portion of the sleeve 4 is visible thus to provide a visual signal that the nut shoulder 14 has contacted the stop collar 12 and that the required degree of compression has been exerted on the tube T. Another indication of proper assembly is that not more than one full body thread should be exposed beyond the axially inner end of the nut 3.

The gripping of the tube T is such that cold flow thereof cannot occur and even if the tube should shrink, the nut 3 may be further tightened to reestablish the firm grip and to maintain the fluid-tight connection in view of the clearance between the end of the body 2 and the stop collar 12.

If yet a greater pressure on the tube T is desired at the axially inner end portion of the sleeve 4 where it contacts the body cam surface and the outer surface of the tube T, the body cam surface 16 may be modified as shown in FIG. 3, wherein it is rounded to provide a varying mechanical advantage and to provide for contraction of a greater volume of the axially inner end portion of the sleeve 4 than in FIG. 2 embodiment. By reason of the increasing cam angle of surface 16 the initial tightening of the nut 3 will result in contact of the nut shoulder 14 with the stop collar 12 before any great degree of contraction is effected at the axially inner end portion of the sleeve 4 whereby there will be increased axial crowding action of the tube T toward the bottom of the cavity so that when the sleeve 4 is contracted at its axially inner end portion as shown in FIG. 3 it will have effected yet greater compression of the tube T than in FIG. 2 so that the sealing pressure between the sleeve 4 and the body 2 will be greater, as will the contact pressure between the sleeve 4 and the tube T.

Another feature of the FIG. 3 coupling is that when the nut 3 and body 2 are of brass, for example, a nipple 17 as of stainless steel may have a thinner wall than the brass nipple 9 thus to provide a larger flow passage through the coupling assembly.

In the form of the invention illustrated in FIGS. 3 and 4 the nipple 17 has an integral flange portion 18 which initially has a close clearance fit or a snug fit in the bore of the body 2 with its end positioned in abutting engagement with the bottom of the bore. To firmly and accurately secure the nipple 17 to the body 2 in coaxial relation with the bore of the body and also the bores of the sleeve 4 and nut 3, the nipple 17 is staked as at 19 at uniformly circumferentially spaced regions around the flange 18, for example at 5 places 72° apart.

The staking operation may be done as with a tubular tool which closely fits in the bore of the bore of the body 2 and the outside diameter of the nipple 17 and which has at its ends V-shaped projections which perform the staking operation when the nipple 17 has been moved into place against the bottom of the bore of the body 2. This staking operation thus accurately positions the nipple 17 with respect to the bore of the body 2 and serves to tightly expand the flange portion 18 into engagement with the bore of the body 2.

With reference to FIGS. 5 and 6, the body 2 and nut 3 may be the same as in FIGS. 1 and 2 and the nipple 20 may be similar to the nipple 17 in FIG. 3 or if desired, the nipple 9 of FIGS. 1 and 2 may be used. The principal difference in the FIGS. 5 and 6 coupling is that the sleeve 21 while yet very thin at its ends, e.g., 0.009 inch to 0.013 inch for sleeves for 1/4 inch and 3/8 inch diameter tube T or 0.0125 inch to 0.0165 inch for 1/2 inch diameter tube T, is uniformly tapered from its ends toward the middle at say, a 9° or 10° angle whereas the body and nut cam surfaces 7 and 8 are tapered at an angle of 20°. The nipple 20 has a flange 23 which is staked as at 24 to expand it tightly in the body bore.

When the FIG. 5 coupling is tightened as shown in FIG. 6 the axially outer end portion of the sleeve 21 is again flared outwardly so as not to be embedded in the tube surface but yet the axially outer end portion has been contracted to greater extent than the axially inner end portion to tightly grip the tube T to axially crowd the tube material and to displace it toward the axially inner end portion of the sleeve whereat a tighter seal and greater compression is achieved despite the lesser amount of contraction of the axially inner end portion of the sleeve 21. As in the other forms of the invention, the sleeve 21 in its contracted condition is of arched configuration from the middle towards its ends and the ends are reversely curved to prevent cutting or peeling of the outer surface of the tube T by the axially inner end portion of the sleeve 21.

The tube coupling illustrated in FIG. 7 comprises a body 2, a nut 25 having screw threaded engagement with said body 2, and a contractible tube embracing sleeve 4 having its end portions 5 and 6 (see FIG. 1) in engagement with corresponding tapered cam surfaces 7 and 8 of the body 2 and nut 25. As in the other forms of the invention disclosed herein, the bores in the nut 25, sleeve 4, and body 2 are preferably of substantially equal diameter slightly larger than the outside diameter of the tube T to be coupled. In the case of a tube T of nylon or like thermoplastic material there is secured in the body 2 a tube supporting nipple 26 which preferably has an outside diameter approximately equal to the inside diameter of the tube T. The flange 27 of the nipple 26 is of diameter substantially equal to the diameter of the body 2 bore and has struck therefrom two or more equally spaced axially extending tabs 28 which are frictionally engaged in the bore 29 of the body 2 so as to retain the nipple 26 and body 2 together during shipment, storage, and handling. However, when the nut 25 is unscrewed from the body 2 after the sleeve 4 has been contracted as shown in FIG. 7 the withdrawal of the tube T and the contracted sleeve 4 therearound will also withdraw the nipple 26 from the body 2 so that the nipple 26 thus becomes a part of the tube-sleeve assembly.

If it be desired that the nipples 9, 17, and 20 of FIGS. 2, 3, and 5 be withdrawable from the body 2 together with the tube T and the contracted sleeves 4 and 21 therearound, the respective knurling and staking operations may be such that the nipples 9, 17, and 20 merely have a snug fit in the body bore so as to be retained in the body during shipment, storage, and handling. However, once the tube T is in tight frictional engagement with the nipple 9, 12, or 20 by contraction of the sleeve around the tube T, the nipple 9, 17, or 20 will become a part of the tube-contracted sleeve assembly as aforesaid.

In the forms of the invention disclosed in FIGS. 2, 3, and 6 the axially outer portion of the sleeves 4 and 21 are flared outwardly as shown so as not to be embedded in the tube. When the sleeves are flared out as shown in FIGS. 2, 3, and 6 the unscrewing of the nut 3 in each case is impeded and if this is found objectionable, the nut bore 30 may be extended as shown in FIG. 7 to preclude such flaring out of the axially outer end portion of the contracted sleeve 4 or 21. In FIG. 7 the axially outer portion of the sleeve 4 is surrounded by the nut bore 30 against such flaring out, and especially in the case of the sleeve 4 having the beveled ends 5 and 6 in which the radial thickness at the extreme ends is only slightly greater than the clearance between the tube T diameter and the nut bore 30, the assembly of the FIG. 7 coupling does not result in any appreciable embedding of the axially outer end portion of the sleeve 4 in the tube T. It is believed that when the nut 25 is being tightened and the sleeve 4 is being contracted, the axial crowding action on the tube T pushes the material of the tube T axially inwardly with a resulting necking of the tube cross-section as shown in FIG. 7 without appreciable embedding of the axially outer end portion of the sleeve 4. However, the FIG. 7 tube coupling is characterized in that the contracted sleeve 4 is of arched configuration between its ends and the end portions in turn, are of reversely curved configuration and due to the crowding action, although the axially outer end portion of the sleeve 4 has been contracted to greater degree than the axially inner end portion, the axially outer end portion is not embedded appreciably in the tube T and yet the axially inner end portion of the sleeve 4 which has been contracted to less degree has the greater sealing and gripping engagement without cutting or peeling of the surface of the tube. It is to be understood that the nut 25 may be employed with the body 2 shown in FIG. 3 or with the sleeve 21 shown in FIG. 5.

If desired, the sleeves 4 and 21 may have internally roughened, serrated, or grooved surfaces in the arched region for improved gripping power.

I, therefore, particularly point out and distinctly claim as my invention:

1. A tube coupling joint comprising a tube of elastomeric material; a body; a nut having screw-threaded engagement with said body; said body and nut having annular cam surfaces which move axially toward each other when said nut and body are screwed together; a sleeve having tapered end portions engageable with the respective cam surfaces of said body and nut; said body, sleeve and nut having coaxial bores of substantially the same diameter to receive the end portion of said tube; a tube supporting nipple radially spaced from said body, sleeve, and nut bores and disposed within the end portion of said tube; said sleeve being radially contracted axially inwardly of its inner and outer extremities by the respective cam surfaces upon screwing together of said nut and body to engage said tube therewithin to tightly squeeze it against said nipple to displace portions of said elastomeric tube material adjacent said inner and outer extremities and to effect sealing engagement between the axially inner end portion of said sleeve with said body cam surface and with said tube gripped thereby; said nut and sleeve having interengageable radially overlapping shoulders which limit the degree of contraction of the axially outer end portion of the sleeve; said shoulder of said sleeve being axially spaced from said body; the axial length of said sleeve from said shoulder thereof to the outer end thereof being greater than the axial distance from the nut shoulder to the axially outer end of said bore of the nut which has substantially the same diameter as the bores of said body and sleeve; the bore in said nut terminating short of the axially outer extremity of the contracted sleeve whereby the extreme end of said sleeve extends beyond said bore and is flared outwardly by said displacement of said elastomeric tube material adjacent said other end portion to a greater diameter than said nut bore and said tube.

2. A tube coupling joint comprising a tube of elastomeric material; a body; a nut having screw-threaded engagement with said body; said body and nut having annular cam surfaces which move axially toward each other when said nut and body are screwed together; a sleeve having tapered end portions engageable with the respective cam surfaces of said body and nut; said body, sleeve and nut having coaxial bores of substantially the same diameter to receive the end portion of said tube; a tube supporting nipple radially spaced from said body, sleeve, and nut bores and disposed within the end portion of said tube; said sleeve being radially contracted at its end portions by the respective cam surfaces upon screwing together of said nut and body to engage said tube therewithin to tightly squeeze it against said nipple and to effect sealing engagement of the axially inner end portion of said sleeve with said body cam surface and with said tube gripped thereby; said nut and sleeve having interengageable radially overlapping shoulders which limit the degree of contraction of said axially outer end portion; and stop means in said body against which the end of said tube is abutted whereby during contraction of the axially outer end portion of said sleeve, said sleeve moves axially with respect to said tube while said axially inner portion is in engagement with said body cam surface thus to effect radial contraction of the axially inner end portion of said sleeve and axial crowding of the material of said tube to enhance the sealing and gripping pressure at said axially inner end portion; the outer end of the sleeve upon contraction thereof as aforesaid causing tube material adjacent thereto to be displaced forwardly and radially outwardly, said nut cam surface being shaped to initially engage said sleeve outer end portion at the axially outer end of said sleeve outer end portion and at its largest diameter being no greater than the largest diameter of the axially outer tapered end portion of said sleeve, said sleeve between the contracted end portions being supported by said displaced tube material whereby the radially outer surface of said sleeve outer end portion is deformed to engage substantially the entire cam surface of said nut when said nut shoulder is in engagement with said sleeve shoulder, said sleeve shoulder being midway between the ends thereof whereby said sleeve is identical on opposite sides of said shoulder and thus to render said sleeve reversible to achieve the same results irrespective of the endwise disposition of said sleeve on said tube.

3. The joint of claim 2 wherein said nut and body bores are cylindrical and intersect the respective nut and body cam surfaces; and wherein said sleeve outer and inner end portions, when contracted as aforesaid, are deformed by said displaced tube material to conform to and engage said nut and body bores.

4. A tube coupling joint comprising a tube of elastomeric material, a body; a nut having screw-threaded engagement with said body; said body and nut having annular cam surfaces of substantially the same taper and which move axially toward each other when said nut and body are screwed together; a sleeve having oppositely tapered inner and outer end portions engageable with the respective cam surfaces of said body and nut; the taper of the sleeve end portions being less than the taper of said cam surfaces whereby the cam surfaces initially engage the sleeve tapered surfaces at the small diameter ends thereof; said body, sleeve, and nut having coaxial bores of substantially the same diameter receiving the end portion of said tube; a tube supporting nipple radially spaced from said body, sleeve, and nut bores and disposed within the end portion of said tube; said sleeve being radially contracted at its end portions by the respective cam surfaces upon screw-ing together of said nut and body and engaging the tube to tightly squeeze it against said nipple and to effect sealing engagement of the axially inner end portion of said sleeve with said body cam surface and with the exterior of the tube gripped thereby; said sleeve having a radially projecting annular rib, said rib upon normal tightening of the nut being in engagement with a shoulder in the nut to limit the degree of contraction of the axially outer end portion of said sleeve; and stops means in said body against which the end of said tube is abutted whereby during contraction of the axially outer end portion of said sleeve, said sleeve moves axially with respect to said tube while said axially inner portion is in engagement with said body cam surface thus to effect radial contraction of the axially inner end portion of said sleeve and axial crowding of the material of said tube to enhance the sealing and gripping pressure at said axially inner end portion; said inner and outer sleeve portions in contracted condition being deformed to conform to the taper of and to engage the respective body and nut cam surfaces; said rib being located midway between the ends of the sleeve, and the sleeve portions on each side of the rib being identical thus to render said sleeve reversible to achieve the same results irrespective of the endwise disposition of said sleeve on said tube, said axially outer and inner end portions being tapered to relatively thin extremities which, in contracted condition, include substantially cylindrical extension surfaces which are respectively disposed within said nut and body bores and are supported by material of the tube so as to conform to and engage the respective nut and body bores.

5. The joint of claim 4 wherein said axially outer and inner end portions have terminal portions which are tapered at approximately the same angle as the taper of the respective nut and body cam surfaces, thus to facilitate coaxial alignment of the sleeve bore with said nut and body bores.

* * * * *